United States Patent
Hsieh et al.

(10) Patent No.: US 9,201,531 B2
(45) Date of Patent: Dec. 1, 2015

(54) TOUCH DISPLAY DEVICE WITH FLEXIBLE CIRCUIT MODULE

(71) Applicant: AU Optronics Corporation, Hsin-Chu (TW)

(72) Inventors: Hsin-Yi Hsieh, Hsin-Chu (TW); Ta-Jen Huang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 14/517,538

(22) Filed: Oct. 17, 2014

(65) Prior Publication Data

US 2015/0160749 A1     Jun. 11, 2015

(30) Foreign Application Priority Data

Dec. 6, 2013 (TW) .............................. 102144928 A

(51) Int. Cl.
*G06F 3/041* (2006.01)

(52) U.S. Cl.
CPC ...... *G06F 3/041* (2013.01); *G06F 2203/04102* (2013.01)

(58) Field of Classification Search
None
See application file for complete search history.

(56) References Cited

U.S. PATENT DOCUMENTS 8,743,310 B2    6/2014   Yan et al.

FOREIGN PATENT DOCUMENTS

| TW | 201305667 | 2/2013 |
|----|-----------|--------|
| TW | 201321853 | 6/2013 |
| TW | 1440939   | 6/2014 |

OTHER PUBLICATIONS

English translation of abstract of TW I440939 (published Jun. 11, 2014).
English translation of abstract of TW 201321853 (published Jun. 1, 2013).
Mektec products: http://www.mektec.com.tw/chinese/02_products/02_detail.aspx?MainID=20.

*Primary Examiner* — Nicholas Lee
(74) *Attorney, Agent, or Firm* — McClure, Qualey & Rodack, LLP

(57) ABSTRACT

A touch display device is provided. A bottom surface of a substrate of a touch panel has a touch area and a connection area. A set of touch electrodes are disposed on the touch area, and a connecting pad is disposed on the connection area to connect the set of touch electrodes. A glue layer is disposed between the surface of the display panel and the touch area. A gap is formed between the surface of a display panel and the connection area. A connecting part of a flexible circuit module is connected to the connecting pad. A bending part has a first end connected to the connecting part and a second end connected to an extension part. The extension part extends out of the gap from the second end. A portion of the extension part, the connecting part, and the bending part are located within the gap.

10 Claims, 6 Drawing Sheets

TOUCH DISPLAY DEVICE WITH FLEXIBLE CIRCUIT MODULE

BACKGROUND OF THE DISCLOSURE

1. Field of the Disclosure

The present disclosure relates to a touch display device; particularly, the present disclosure relates to a touch display device with a design of a flexible circuit module.

2. Description of the Related Art

With the technique development, size of portable electronic devices must satisfy light, thin, short, and small characteristics for achieving the easy to carry purpose. It is more important to assemble a touch panel and an exterior case in an assembly process of a touch display device. The quality of assembling the touch panel and the exterior case will influence the structural stability and display effect of the touch display device. However, as the thickness of the display panel, touch panel, and the backlight module becomes more and more thinner, the thinner size causes changes in space and inconsistent height between the touch panel and the exterior case (or namely outer shell, or outer casing, or outer housing).

For example, when the whole touch display module is getting thinner, the thickness of the exterior case should be thinner accordingly. However, the thickness of the exterior case fails to match that of the touch display module due to manufacturing process factors related to injection molding of the exterior case. As such, the whole structural stability will be affected if there is a difference in the height direction after assembling the touch panel and the exterior case. Besides, the height difference between the touch panel and the exterior case may result in light leakage and influence the display effect. Therefore, the assembling problems existed in the aforementioned touch display device need to be solved.

SUMMARY OF THE DISCLOSURE

It is an object of the present disclosure to provide a touch display device with a flexible circuit module to enhance the structural stability.

The touch display device includes a display panel and a touch panel stacked on a surface of the display panel. The touch panel includes a substrate having a bottom surface, a set of touch electrodes, and a connecting pad. The bottom surface has a touch area and a connection area. The set of touch electrodes are disposed on the touch area, and the connecting pad is disposed on the connection area to connect the set of touch electrodes. A glue layer is disposed between the surface of the display panel and the touch area. A gap is formed between the surface of the display panel and the connection area without the glue layer disposed therein. A connecting part of a flexible circuit module is connected to the connecting pad and partially disposed in the gap. A bending part has a first end connected to the connecting part and a second end connected to an extension part. The extension part extends out of the gap from the second end. A portion of the extension part, the connecting part, and the bending part are located within the gap. The bending part of the flexible circuit module can be adjusted according to the height difference between the touch panel and the display panel to maintain a better assembly effect.

DETAILED DESCRIPTION OF THE PREFERRED EMBODIMENT

Figure 1:
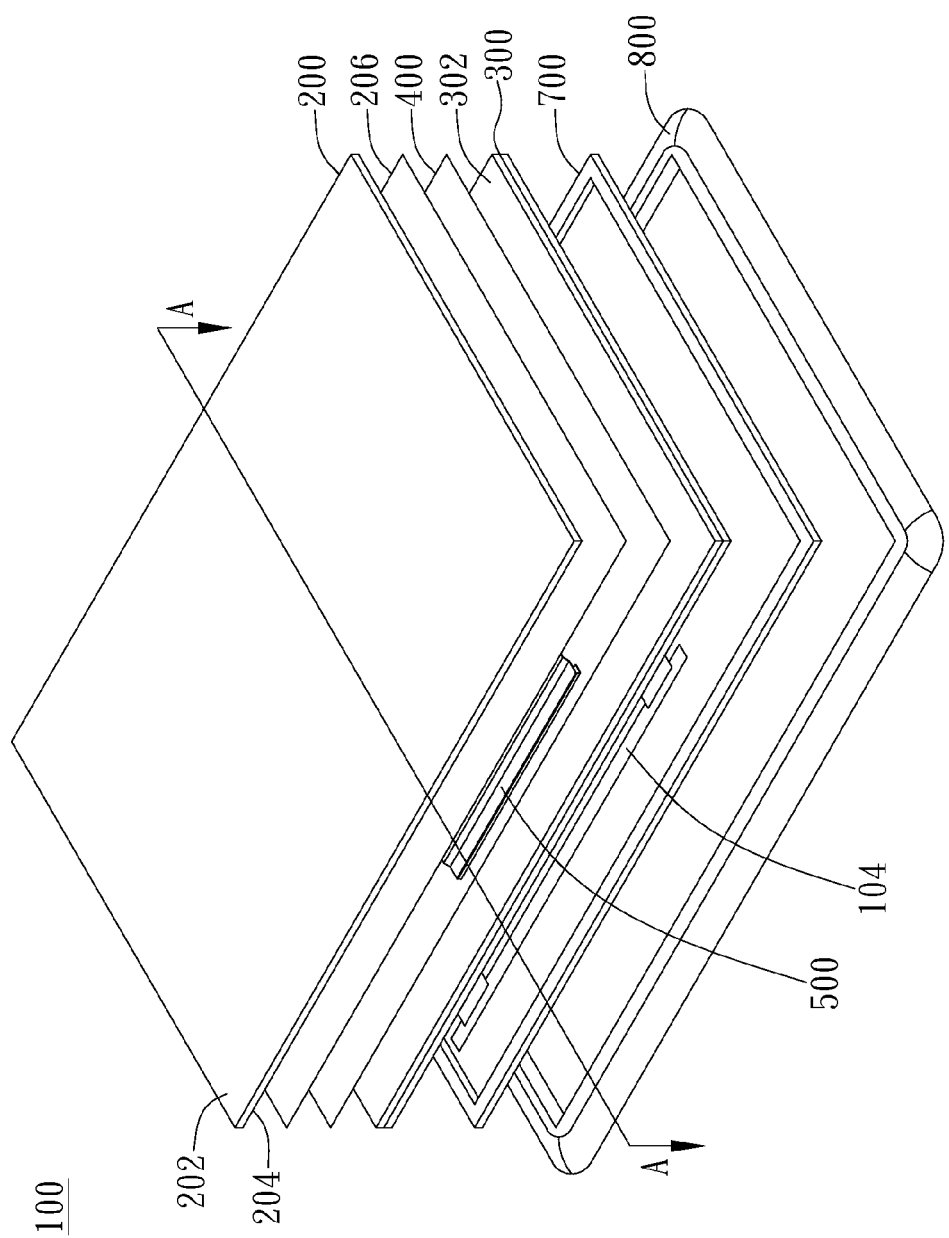
FIG. 1 is an exploded view of a touch display device of the present disclosure.

The touch display device of the present disclosure preferably utilizes and adjusts a flexible circuit module according to the different thickness between a display panel and a touch panel. In addition, the touch display device is preferably applied to portable electronic devices such as mobile phones, tablets, notebooks, or other suitable electronic devices; while in different embodiments, the touch display device may be applied to non-portable electronic devices such as monitors, televisions, or other suitable electronic devices. FIG. 1 is an exploded view of a touch display device 100 of the present disclosure. As shown in FIG. 1, the touch display device 100 includes a touch panel 200, at least one set of serially-connected touch electrodes 206, a display panel 300, a glue layer 400 disposed on a surface 302 of the display panel 300, a backlight module 700, a flexible circuit module 500, and an exterior case (or namely outer shell, or outer casing, or outer housing) 800, wherein the set of serially-connected touch electrodes 206 can be regarded as a film and also called a touch electrode layer.

Figure 2:
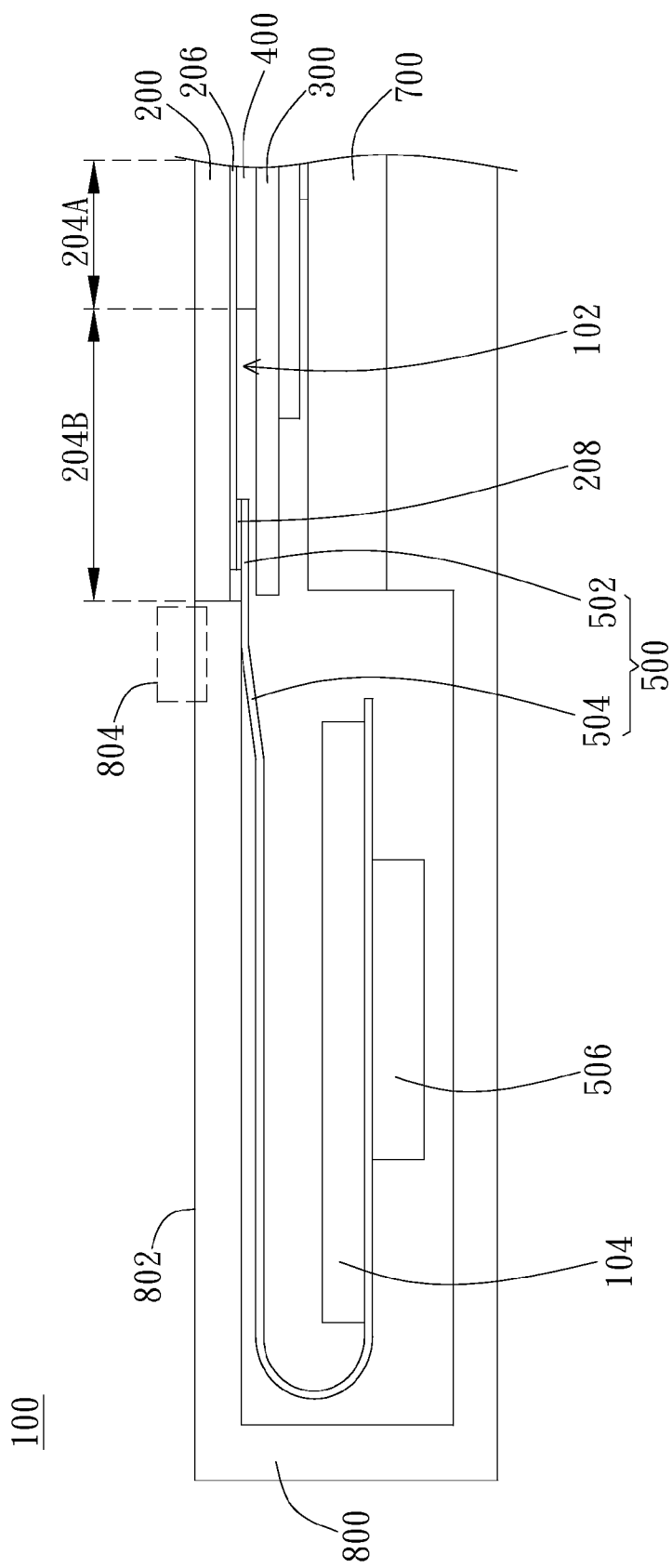
FIG. 2 is a cross-sectional view of the first embodiment of the touch display device of the present disclosure.

FIG. 2 is a cross-sectional view (along the A-A direction in FIG. 1) of the first embodiment of the touch display device 100 of the present disclosure. As shown in FIG. 2, the touch panel 200 is stacked on the surface 302 of the display panel 300 (please refer to FIG. 1). The surface 302 is preferred a display surface (also called outer surface, or top surface). The touch panel 200 includes a substrate having a bottom surface 204 (or called inner surface) and a touch surface 202 (also called top surface, or outer surface) opposite to the bottom surface 204 (please refer to FIG. 1). A touch area 204A and a connection area 204B are defined on the bottom surface 204, wherein the set of serially-connected touch electrodes 206 are disposed on the touch area 204A, and a connecting pad 208 is disposed on the connection area 204B. The connecting pad 208 connects the set of serially-connected touch electrodes 206. Touch technologies utilized herein can be resistive type, capacitive type, wave type, etc. In embodiments of the present disclosure, the capacity type is preferably adopted. The set of serially-connected touch electrodes 206 can be disposed on the inner surface and the outer surface of the substrate of the touch panel 200, or disposed on the bottom surface of the substrate of the touch panel 200. It is noted that the term "disposed" described herein means located within a projection range of the touch area 204A in a vertical direction, not limited to be physically connected to the touch area 204A. Besides, a glue layer 400 is preferably disposed between the surface 302 of the display panel 300 and the touch area 204A. The glue layer 400 is made of, for example, a transparent optically clear adhesive (OCA) having good transmittance (for example, visible transmittance is more than about 90%). It is noted that a gap 102 is formed between the surface 302 of the display panel 300 and the connection area 204B without the glue layer 400 disposed therein.

Besides, the touch display device 100 includes the flexible circuit module 500. The flexible circuit module 500 is preferably composed of a flexible circuit board. A connecting part 502 of the flexible circuit module 500 is connected to the connecting pad 208 and at least partially disposed in the gap 102. One end of the connecting part 502 is connected to an extension part 504 and extends out of the gap 102 toward a direction away from the display panel 300. In other words, one side of the flexible circuit module 500 (or called fixing side) where the connecting part 502 locates is utilized to fix an end surface of the flexible circuit module 500 onto the connecting pad 208, and the other side opposite to the fixing side extends out of the gap 102 to form the extension part 504. As shown in FIG. 2, the flexible circuit module 500 preferably further includes a control circuit module 104 and a touch panel circuit element 506 disposed on the extension part 504. The control circuit module 104 and the touch panel circuit element 506 are disposed at opposite surfaces of the flexible circuit module 500, wherein the control circuit module 104 electrically is connected to the flexible circuit module 500 and the display panel 300. The control circuit module 104 provides a control signal to the display panel 300 and electrically connects the touch panel circuit element 506 to receive a touch signal from the touch panel 200.

In addition, the touch display device 100 further includes the exterior case 800 covering the extension part 504. A side edge of the exterior case 800 touches a side edge of the substrate of the touch panel 200. The exterior case 800 is preferably made of plastic and formed by the injection molding method, but not limited thereto. The exterior case 800 can be made of metal, alloys, wood, leather, etc. A contact area (or namely other touch area, or sensitive area) 804 is formed on the exterior case 800 (marked by broken line in FIG. 2) and corresponds to and above the extension part 504. The contact area 804 serves as a button (such as a button of mobile phone or other suitable operating function) on the exterior case 800 for operating the touch display device 100. The contact area 804 can be, for example, capacitive type, resistive type, light sensing type, mechanic type, an electric field touch unit, a fingerprint recognition unit, or other suitable types or units, such as an iris recognition unit, a vocal recognition unit, a face recognition unit, etc. Therefore, the contact area 804 is also called a recognition area or an additional operation area. On a whole, the exterior case 800 and the touch surface 202 together construct at least a part of the outer appearance of the touch display device 100. On the other hand, the outer surface 802 of the exterior case 800 (or called the outer surface 802 of the top portion of the exterior case 800) and the touch surface 202 of the touch panel 200 are substantially a coplanar plane. As shown in FIG. 2, the outer surface 802 and the touch surface 202 are surfaces not contacting a surface of the flexible circuit module 500 (i.e. surfaces facing outside). Besides, the outer surface 802 and the touch surface 202 are substantially at the same level. In this embodiment, the control circuit module 104 and the touch panel circuit element 506 are covered in the exterior case 800, but not limited thereto.

Figure 3A:
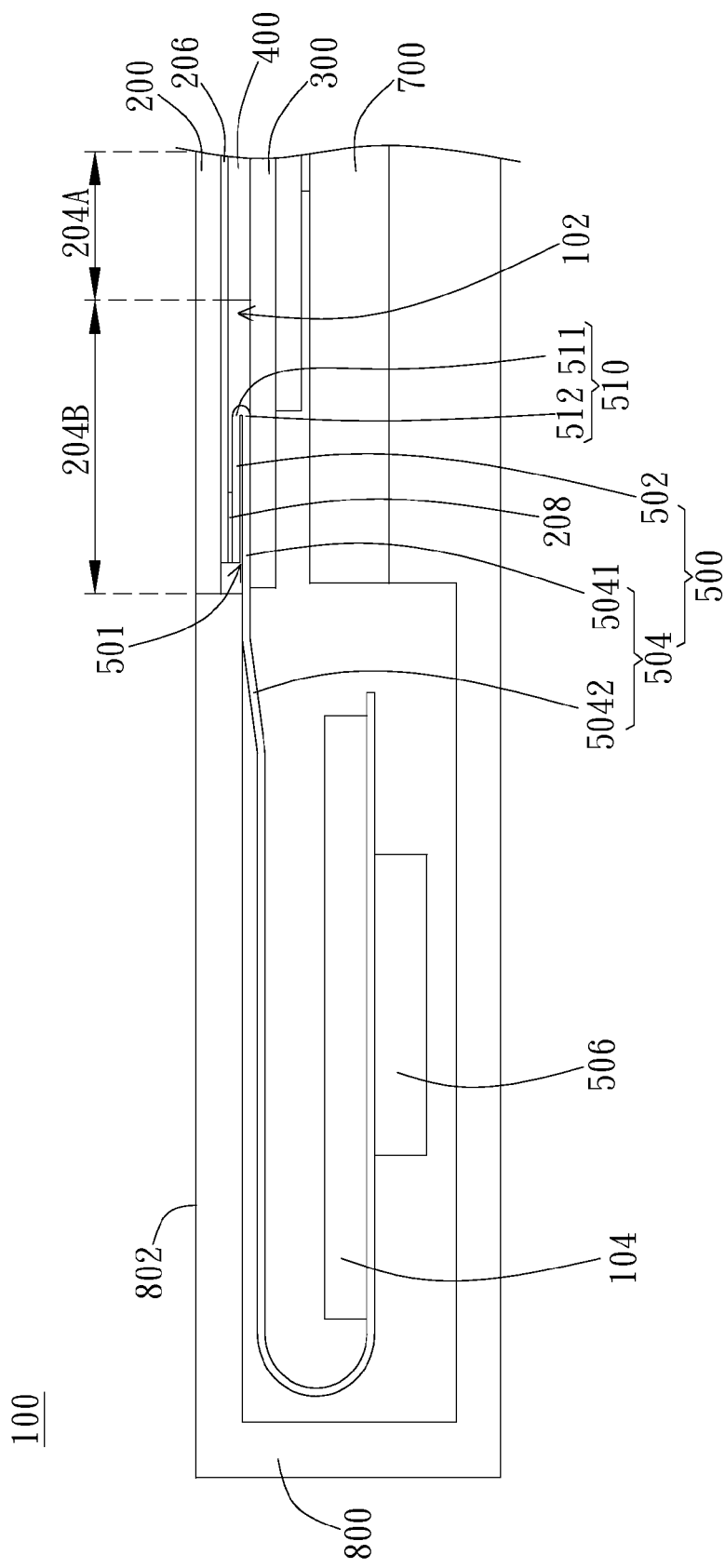
FIG. 3A is a cross-sectional view of the second embodiment of the touch display device of the present disclosure.
Figure 3B:
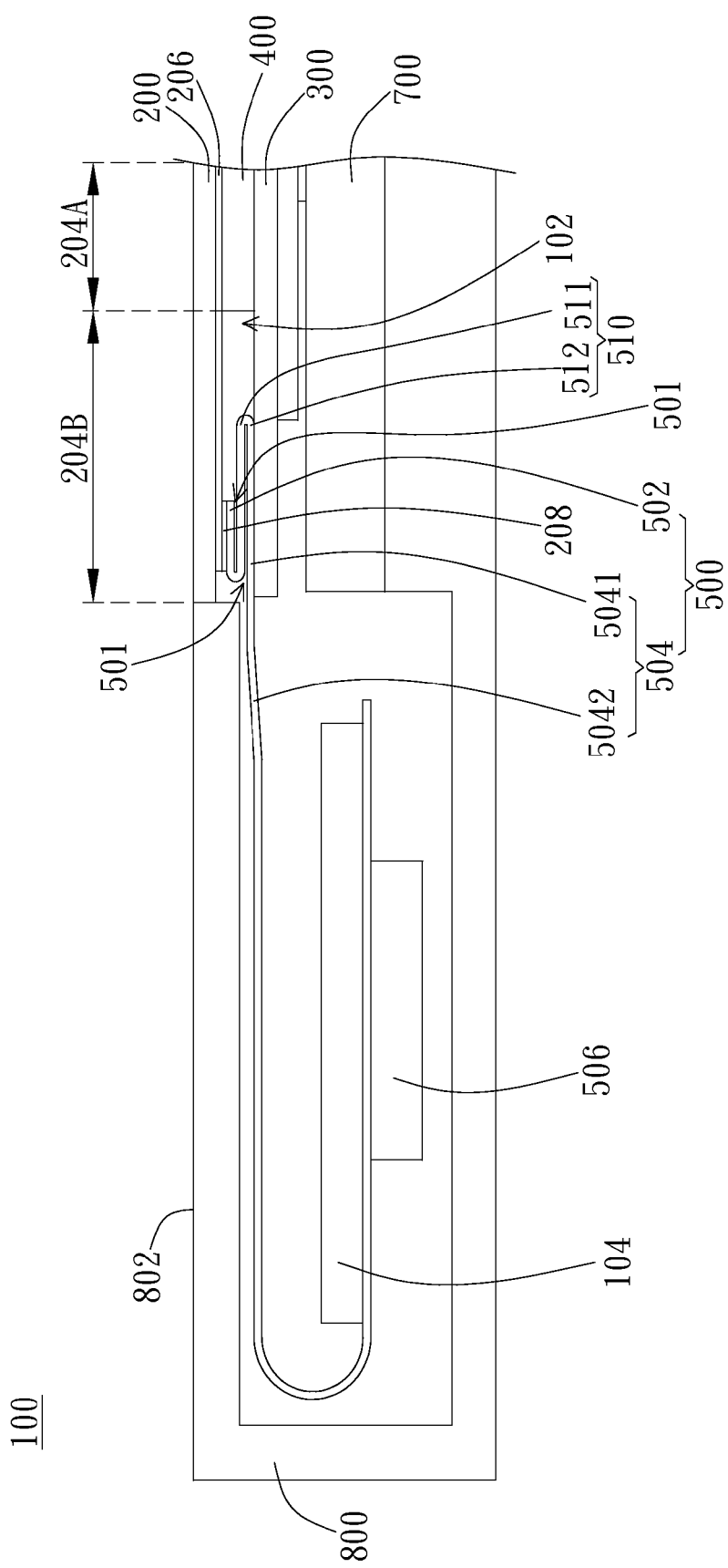
FIG. 3B is a cross-sectional view of the third embodiment of the touch display device of the present disclosure.

FIG. 3A is a cross-sectional view of the second embodiment of the touch display device of the present disclosure. One difference from the previous embodiment is: in addition to the connecting part 502 and the extension part 504, the flexible circuit module 500 further includes a bending part 510. As shown in FIG. 3A, a portion of the extension part 504, the connecting part 502, and the bending part 510 are located within the gap 102. The bending part 510 has a first end 511 and a second end 512. The first end 511 is connected to the connecting part 502. The second end 512 is connected to the extension part 504, and the extension part 504 extends out of the gap 102 from the second end 512. The connecting part 502, the bending part 510, and the extension part 504 together form a U-shaped opening 501 in side view. The U-shaped opening 501 preferably faces outside the gap 102, i.e. the extension direction of the opening 501 extends along the direction without the display panel 300 and the touch panel 200. The extension direction of the opening 501 can be regarded as a direction extending toward a side of the exterior case 800. In other embodiments, if the touch panel 200 (or the display panel 300) has a much thinner thickness, the flexible circuit module 500 can be accordingly adjusted as an S-shaped curve in side view. As shown in FIG. 3B, the bending part 510 is composed of two opposite U-shaped openings 501: one opening 501 facing inside the gap 102, and the other opening 501 facing outside the gap 102.

Besides, the extension part 504 can be divided into a first extension part 5041 and a second extension part 5042 according to the shape of the curve. As shown in FIG. 3A, the first extension part 5041 overlaps the connecting part 502, and the second extension part 5042 extends out of the gap 102, i.e. the second extension part 5042 does not overlap the connecting part 502. Comparing to the first embodiment (without the bending part) shown in FIG. 2, the bending and extension feature of the flexible circuit module 500 as shown in FIGS. 3A and 3B is formed by folding the flexible circuit module 500 and then connected to the connecting pad 208 of the touch electrode 206 on the touch panel 200. As such, the bending part 510 of the flexible circuit module 500 can fill in the gap 102 in various manners according to the change of height of the touch panel 200 and the display panel 300, so that the outer surface 202 of the touch panel 200 and the outer surface 802 of the exterior case 800 are substantially at the same level, i.e. there is no height difference between the outer surface 202 of the touch panel 200 and the outer surface 802 of the exterior case 800. Thus, a better assembly effect can be provided. In addition, Comparing to the first embodiment (without the bending part) shown in FIG. 2, utilizing the bending part 510 design as shown in FIGS. 3A and 3B, the flexible circuit module 500 can avoid the connecting part 502 from the detachment problem due to pressing operation, shaking force, or long time use, thus the structural stability of the product can be enhanced. Besides, the outer surface 802 of the exterior case 800 (or called the outer surface 802 of the top portion of the exterior case 800) and the touch surface 202 of the touch panel 200 are substantially a coplanar plane.

In FIGS. 3A and 3B, the control circuit module 104 is located in the mezzanine formed by the turning part (or called another bending part substantially forming a U-shaped opening in side view) of the flexible circuit module 500, and the touch panel circuit element 506 is located at a surface of the flexible circuit module 500 facing an inner surface of a bottom portion of the exterior case 800, i.e. the control circuit module 104 and the touch panel circuit element 506 are disposed at opposite surfaces of the flexible circuit module 500. It is noted that in FIG. 3A, the surface of the flexible circuit module 500 where the touch panel circuit element 506 locates is opposite to the surface of the flexible circuit module 500 where the touch panel connects. However, in other embodiments, the touch panel circuit element 506 can be disposed at other part of the flexible circuit module 500 (for example, disposing the touch panel circuit element 506 on an inner surface of the turning part of the flexible circuit module 500 in the exterior case 800), so that the touch panel circuit element 506 and the part of the flexible circuit module 500 connected to the touch panel 200 (i.e. where the connecting pad 208 lies) are located at the same surface, as shown in FIG. 4.

Figure 4:
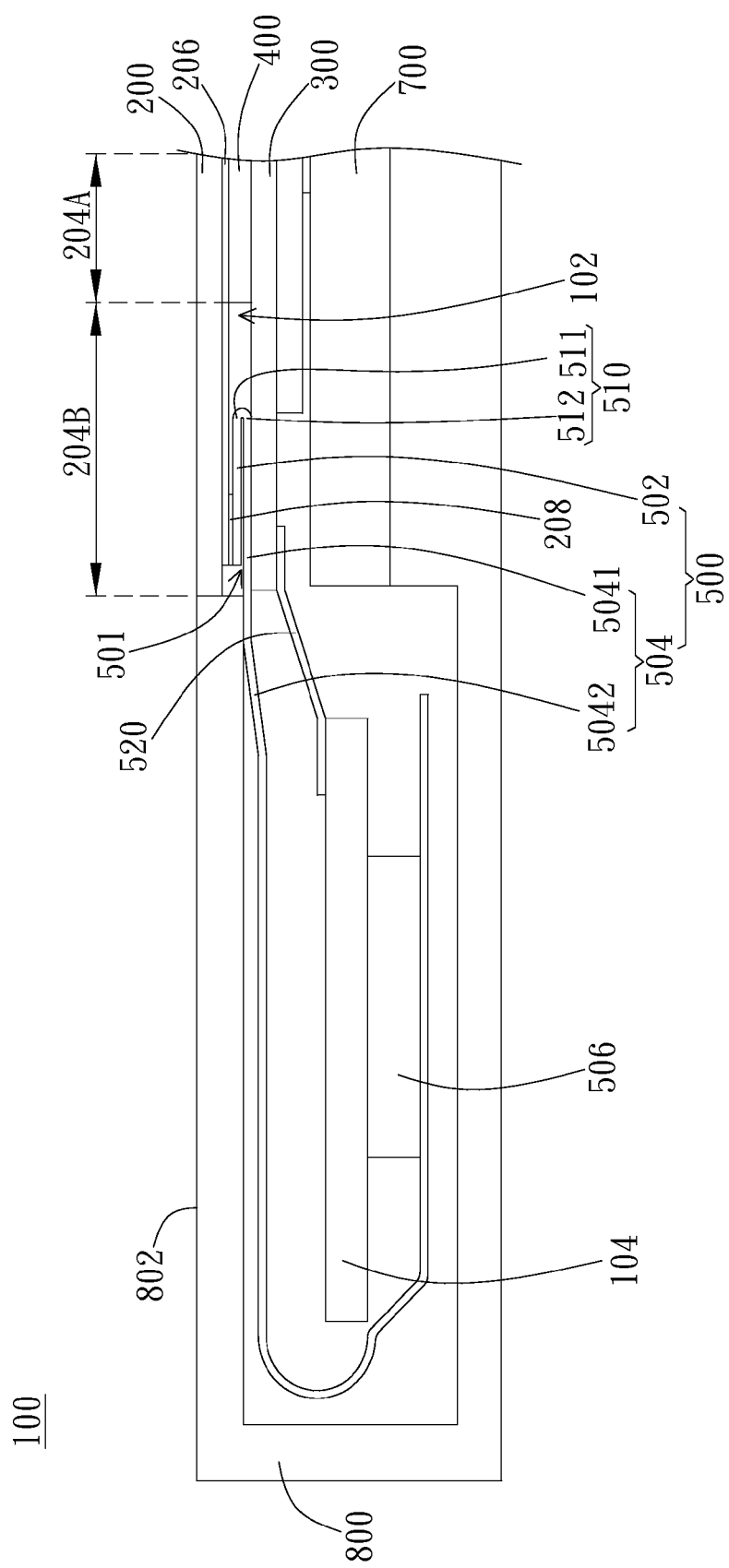
FIG. 4 is a cross-sectional view of the fourth embodiment of the touch display device of the present disclosure.

FIG. 4 is a cross-sectional view of the fourth embodiment of the touch display device of the present disclosure. Comparing to disposing the control circuit module 104 and the touch panel circuit element 506 at opposite surfaces of the flexible circuit module 500 as shown in FIGS. 2 and 3A, the control circuit module 104 and the touch panel circuit element 506 can be disposed at the same surface of the flexible circuit module 500. As shown in FIG. 4, the control circuit module 104 and the touch panel circuit element 506 are located in the mezzanine formed by the turning part (or called another bending part substantially forming a U-shaped opening in side view) of the flexible circuit module 500, wherein the control circuit module 104 is stacked on the touch panel circuit element 506. Besides, the control circuit module 104 connects the display panel 300 by a second circuit module 520 (such as a flexible circuit board). In other embodiments, a gold finger or other connectors may be utilized to connect between the control circuit module 104 and the touch panel circuit element 506 to enhance the integrity. In addition, because the connecting pad 208 and the touch panel circuit element 506 are both disposed at the same surface of the flexible circuit module 500, they can be connected by a circuit disposed at the same surface of the flexible circuit module 500 without drilling holes to connect wires at different surfaces. By this design, a single one side type of the flexible circuit module 500 can be adopted to save cost.

Figure 5:
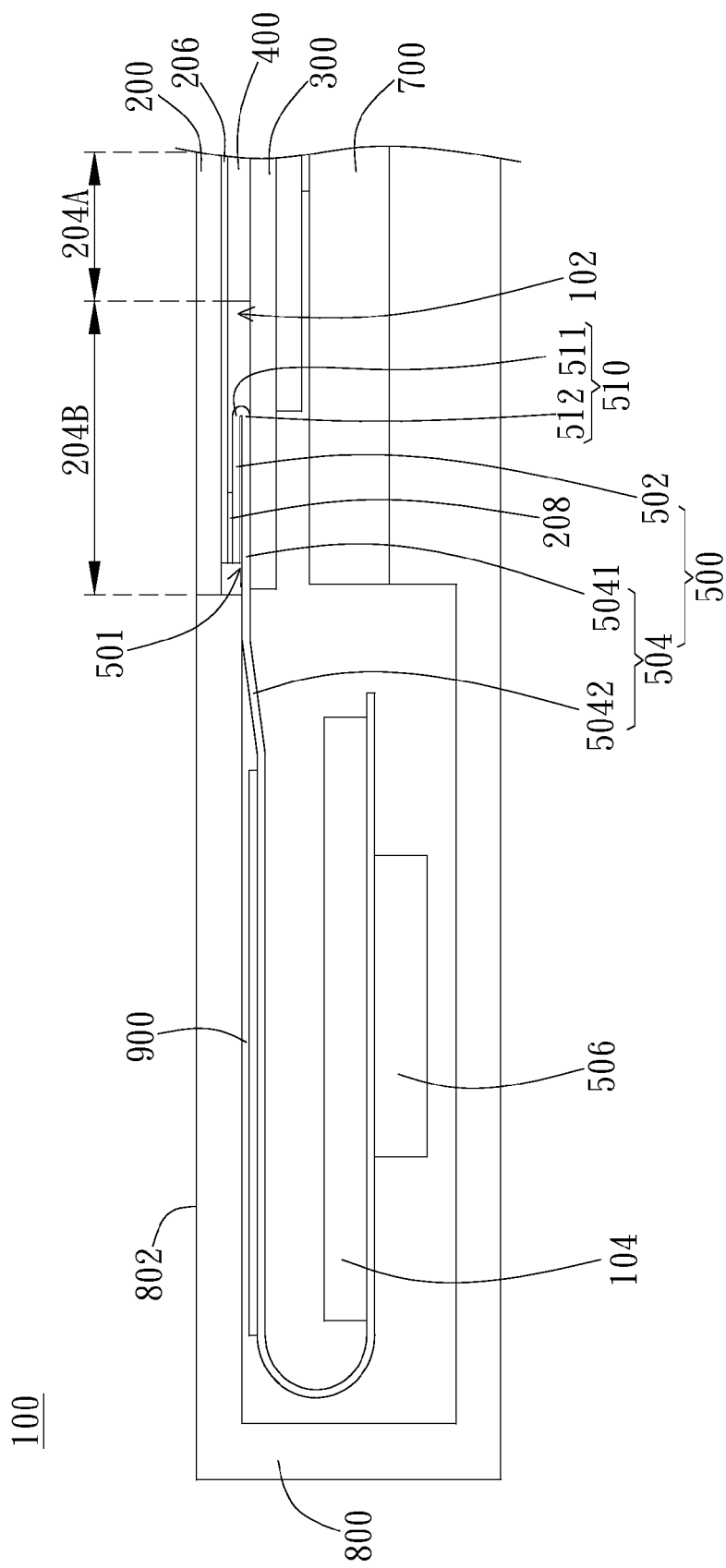
FIG. 5 is a cross-sectional view of the fifth embodiment of the touch display device of the present disclosure.

FIG. 5 is a cross-sectional view of the fifth embodiment of the touch display device of the present disclosure. As shown in FIG. 5, in addition to the aforementioned structures, the touch display device 100 further includes an ink layer 900. The ink layer 900 is disposed on a surface of the extension part 504 facing the touch panel 200 while preferably not to be disposed on the connecting part 502 and the bending part 510. For example, the ink layer 900 is disposed on a surface of the extension part 504 facing the touch panel 200 and a surface of the extension part 504 facing inner surface in a top portion of the exterior case 800, as the side-view shown in FIG. 5. The color of the ink layer 900 may be black or other colors, such as white, red, blue, green, or other colors in a chromaticity coordination system, or a mixing color from at least one of the colors mentioned above. Utilizing the ink layer 900, the light absorption effect can be achieved and light leakage can be reduced. The part of the flexible circuit module 500 having the ink layer 900 printed thereon may have a better stiffness, and the part of the flexible circuit module 500 without the ink layer 900 (such as the connecting part 502 and the bending part 510) may have a better flexibility so that the bending part 510 tends to be bent. Besides, because the connecting part 502 does not have the ink layer 900, the connecting part 502 does not tend to detach from the connecting pad 208 by external force. In other words, different sections of the same flexible circuit module 500 can have different applications by printing the ink layer 900.

A display medium layer (not shown) disposed between two substrates (not shown) of the display panel 300 in aforementioned embodiments may be (taking non-emission materials as example): liquid crystal material, electrophoretic material, electrowetting material, etc. Taking the liquid crystal material as a preferred embodiment, the display panel requires the backlight module 700. Besides, the display medium layer (not shown) disposed between two substrates (not shown) of the display panel 300 in aforementioned embodiments may be (taking emission materials as example): organic material, inorganic material, etc. In this situation, the backlight module 700 is not required; however, if light-emitting molecules of the emission material that need to be excited by light, then an additional backlight module 700 is required. Besides, a container (not shown) may be selectively disposed to accommodate the display panel 300 and the touch panel 200. It is noted that the exterior case 800 in aforementioned embodiments does not serve as the container for accommodating the display panel 300 and/or the touch panel 200. For example, the exterior case 800 may be a frame, a bezel, a supporter, a bracket, or other similar elements. In other words, an outer surface of the exterior case 800 has no other containers.

Although the preferred embodiments of the present disclosure have been described herein, the above description is merely illustrative. Further modification of the disclosure herein disclosed will occur to those skilled in the respective arts and all such modifications are deemed to be within the scope of the disclosure as defined by the appended claims.

What is claimed is:

1. A touch display device, comprising:
   a display panel having a surface;
   a touch panel stacked on the surface of the display panel, wherein the touch panel comprises a substrate having a bottom surface, at least one set of serially-connected touch electrodes, and at least one connecting pad; a touch area and a connection area are defined on the bottom surface; the set of serially-connected touch electrodes are disposed on the touch area; the at least one connecting pad is disposed on the connection area to connect the set of serially-connected touch electrodes;
   a glue layer disposed between the surface of the display panel and the touch area, wherein a gap is formed between the surface of the display panel and the connection area without the glue layer disposed therein; and
   a flexible circuit module comprising:
      a connecting part connected to the at least one connecting pad and at least partially disposed in the gap;
      a bending part having a first end and a second end, the first end connected to the connecting part; and
      an extension part connected to the second end and extending out of the gap from the second end, wherein a portion of the extension part, the connecting part, and the bending part are located within the gap.

2. The touch display device of claim 1, wherein the extension part comprises a first extension part and a second extension part, a portion of the extension part serves as the first extension part overlapping the connecting part, the second extension part extends out of the gap.

3. The touch display device of claim 1, wherein the connecting part, the bending part, and the extension part form a U shape in side view.

4. The touch display device of claim 1, wherein an opening of the U shape face outside of the gap.

5. The touch display device of claim 1, further comprising an exterior case covering the extension part, a side edge of the exterior case touching a side edge of the substrate of the touch panel.

6. The touch display device of claim 5, wherein the touch panel comprises a touch surface opposite to the bottom surface, the exterior case comprises an outer surface, the outer surface and the touch surface form a coplanar surface.

7. The touch display device of claim 5, wherein the exterior case comprises a contact area formed above the second extension part.

8. The touch display device of claim 1, further comprising an ink layer disposed on a surface of the extension part facing the touch panel rather than disposed on the connecting part and the bending part.

9. The touch display device of claim 1, wherein the flexible circuit module further comprises a touch panel circuit element disposed on the extension part.

10. The touch display device of claim 9, further comprising a control circuit module electrically connected to the flexible circuit module and the display panel.

\* \* \* \* \*